(12) United States Patent
Ng

(10) Patent No.: US 6,903,743 B2
(45) Date of Patent: Jun. 7, 2005

(54) DYNAMIC INTERACTIVE ANIMATED SCREEN SAVER

(75) Inventor: Scott Ng, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 268 days.

(21) Appl. No.: 10/272,089

(22) Filed: Oct. 16, 2002

(65) Prior Publication Data

US 2004/0075701 A1 Apr. 22, 2004

(51) Int. Cl.[7] ............................................. G06T 13/00
(52) U.S. Cl. .................................... 345/473; 715/867
(58) Field of Search ................................. 345/473, 764, 345/774, 867, 810; 715/526; 455/466; 704/260

(56) References Cited

U.S. PATENT DOCUMENTS 5,966,691 A * 10/1999 Kibre et al. ................ 704/260
6,125,281 A * 9/2000 Wells et al. ................ 455/466
6,421,694 B1 * 7/2002 Nawaz et al. ............... 715/526
6,507,351 B1 * 1/2003 Bixler ........................ 345/810

* cited by examiner

Primary Examiner—Mark Zimmerman
Assistant Examiner—Lance W. Sealey
(74) Attorney, Agent, or Firm—Hisashi D. Watanabe

(57) ABSTRACT

The present invention provides an apparatus (100) and method (800) for an electronic device having a device display for graphically providing the user with a message (104) while the electronic device is in a screen saver mode displaying a screen saver screen (100). The message is a simplified message derived from an associated message source (200) where more detail (202) is available. The message is replaced with a detailed message upon reaching a predetermined condition.

18 Claims, 9 Drawing Sheets

DYNAMIC INTERACTIVE ANIMATED SCREEN SAVER

FIELD OF THE INVENTION

The present invention relates to an apparatus and method for an electronic device having a display. More specifically, the present invention relates to an apparatus and method for graphically providing a user with alerts and notices while in a screen saver mode.

BACKGROUND OF THE INVENTION

Utilizing a screen saver program to provide reduced graphics or a blank screen during an idle mode of an electronic device is known. A typical screen saver displays on a display multiple objects generally moving across the display. These objects may provide some information such as the current time and a pre-selected message. For example, the screen saver may provide the pager number of the user so that a person looking for the user can be informed how he may reach the user. However, the information provided by the screen saver is very little use to the user of the device.

Accordingly, there is a need for an apparatus and a method for graphically providing useful information to the user during an idle mode of an electronic device when a screen saver program is active.

DETAILED DESCRIPTION OF THE PREFERRED EMBODIMENT(S)

The present invention generally relates to an apparatus and method for an electronic device having a display such as, but not limited to, a personal digital assistant ("PDA"), a personal computer ("PC"), and a cellular telephone. The present invention describes an apparatus and a method for graphically providing alerts and notices on the display of the electronic device while the electronic device is in a screen saver mode. In the screen saver mode, a message bubble containing a short message is displayed moving across the display. The short message may be derived from, but not limited to, a scheduled event, an appointment, voice mail, e-mail, and a Short Message Service (SMS) message. The message bubble includes a visual attribute, which may vary dynamically depending on a condition related to the message such as, but not limited to a type of the message, proximity to the appointment time of the message, and urgency of the message. The display may be partitioned horizontally or vertically into multiple time sections or strips. For example, the display may comprise eight time sections such as the current hour plus minus four hours so that each section represents one-hour window covering eight-hour span having the current hour at the center of the display. The message bubble may be displayed centered about a one-hour section corresponding to the appointment time of the message. The display may further include a tripwire section. When the message bubble enters the tripwire section, the short message displayed in the message bubble is replaced by more detailed version of the message.

Figure 1:
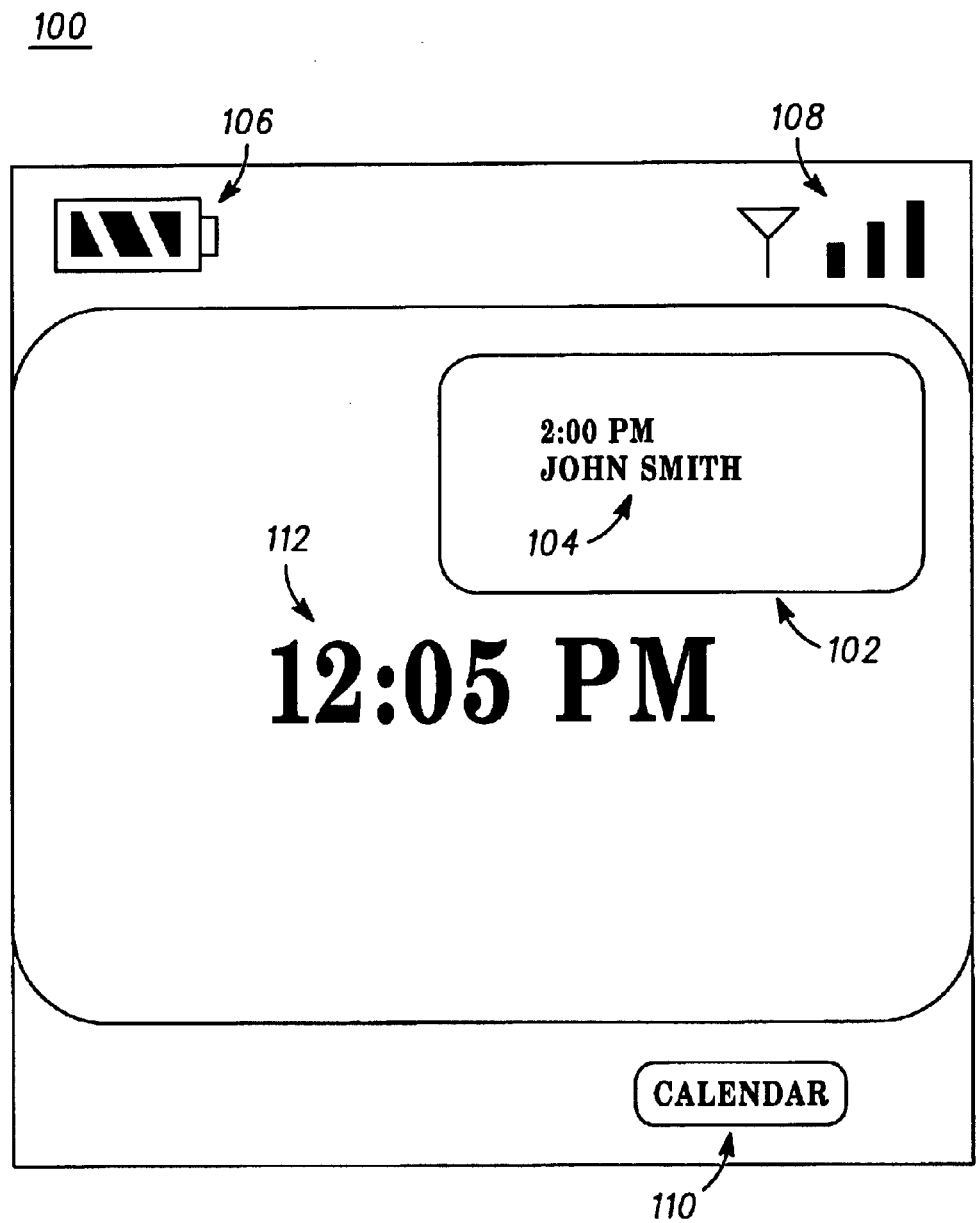
FIG. 1 is an exemplary screen saver display of the present invention.

Referring to FIG. 1, there is provided an exemplary screen saver display 100 of the present invention having a moving message bubble 102, within which a message 104 is displayed, and the following status indicators: a battery status indicator 106, a received signal strength indicator ("RSSI") 108, and a message type indicator 110. The battery indicator shows that the device battery is about 100% of its full charged capacity, the RSSI shows that the received signal is at full strength, and the message type indicator shows that the displayed message is a calendar entry. Each status indicator is varied as the status of the monitored function varies. The current time 112, show as 12:05 PM, may also be displayed as a part of the screen saver display.

Figure 2:
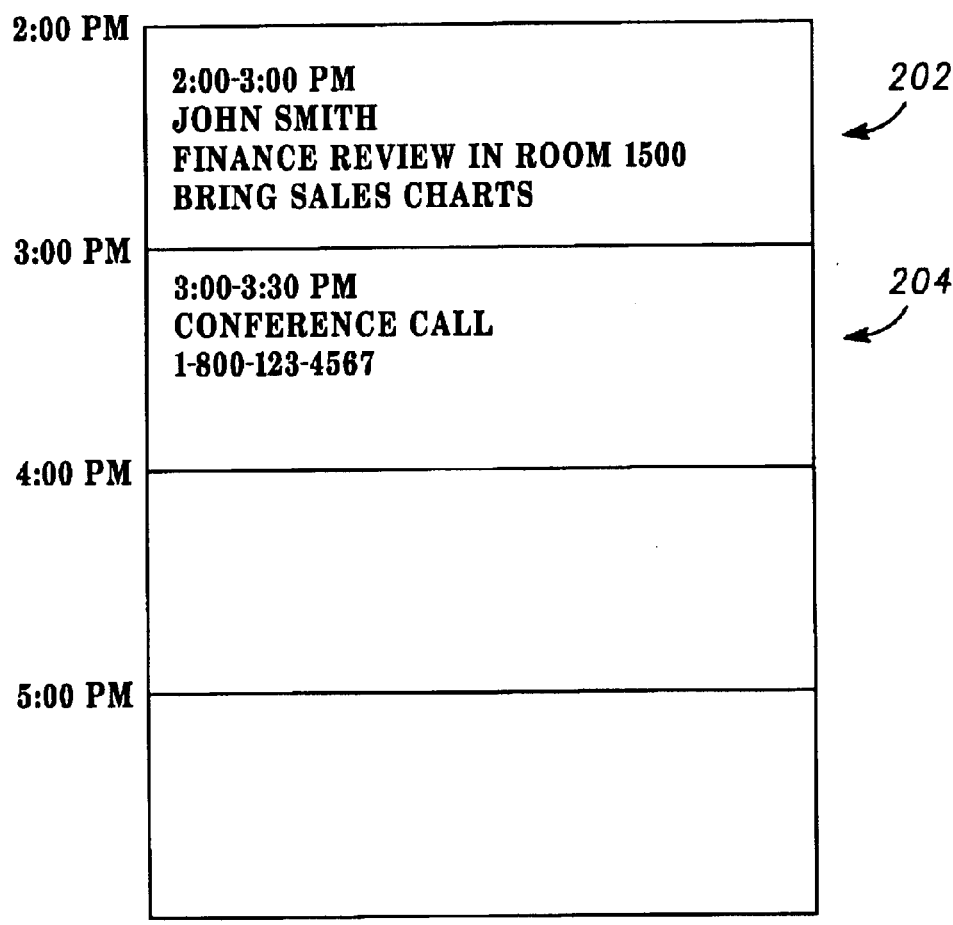
FIG. 2 is an exemplary message source used in the present invention.

The message 102 is associated with a message source 200 as shown in FIG. 2, and is derived from an entry 202 in the message source. In this example, the message source is a calendar program active in the electronic device, and the full message is a calendar entry at 2:00 PM in the calendar program. The calendar program has another entry at 3:00 PM with a full message 204. The message source may additionally include other applications and programs such as, but not limited to, voice mail, e-mail, and a Short Message Service ("SMS") message.

Figure 3:
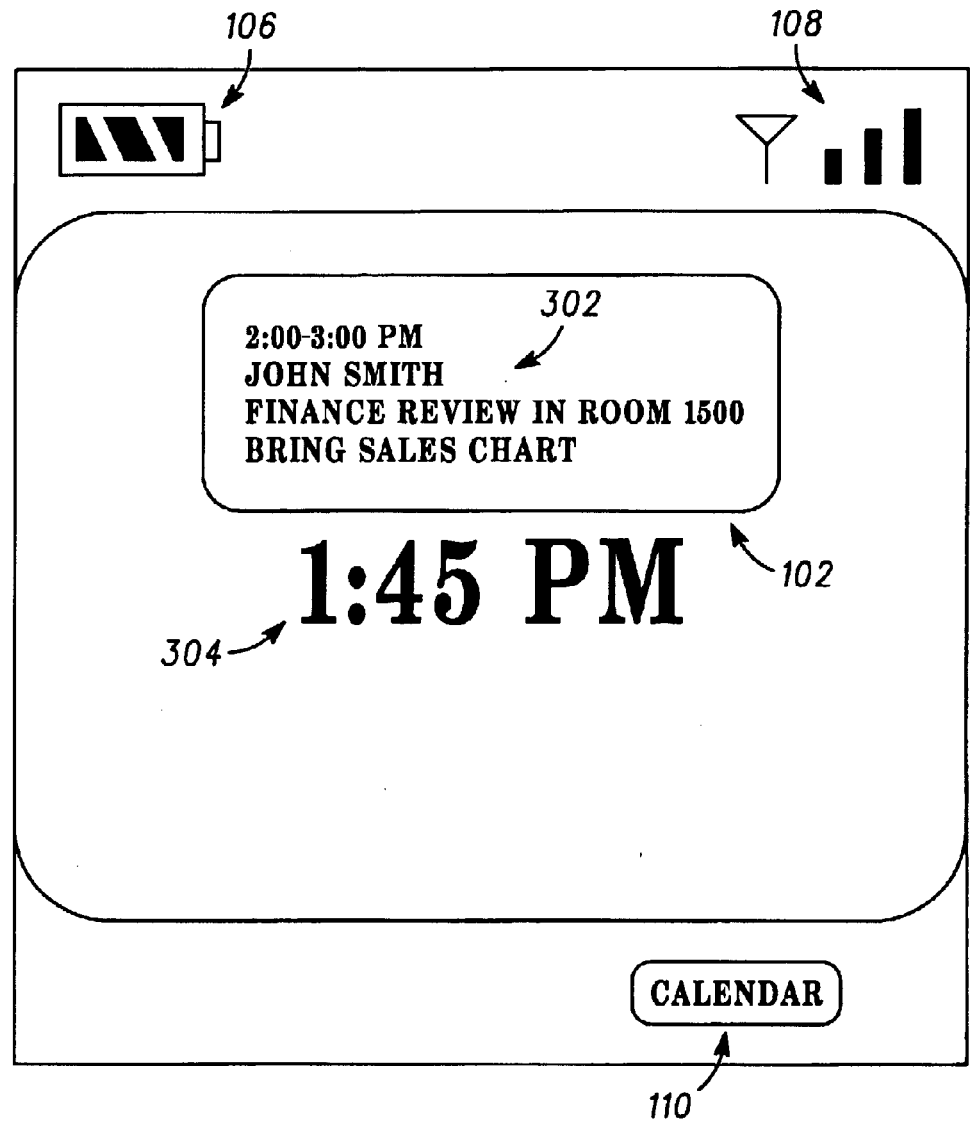
FIG. 3 is an exemplary screen saver display of the first aspect of the present invention.

Referring to FIG. 3, there is provided a first aspect of the present invention. Upon reaching a predetermined time period prior to the scheduled time of the calendar entry, the previous message 104 is replaced with a new message 302. The new message is associated with the same calendar entry 202 as the previous message, but provides more information from the calendar entry. In this example, the message has been made to change 15 minutes before the scheduled time of 2:00 PM, and upon the current time reaching 1:45 PM as shown, the first message has been replaced with the second message. To draw attention of the user, the message bubble may include a visual attribute, which is activated upon reaching the predetermined time period prior to the scheduled time, such as, but not limited to, changing color, expanding the bubble, and flashing the message.

Figure 4:
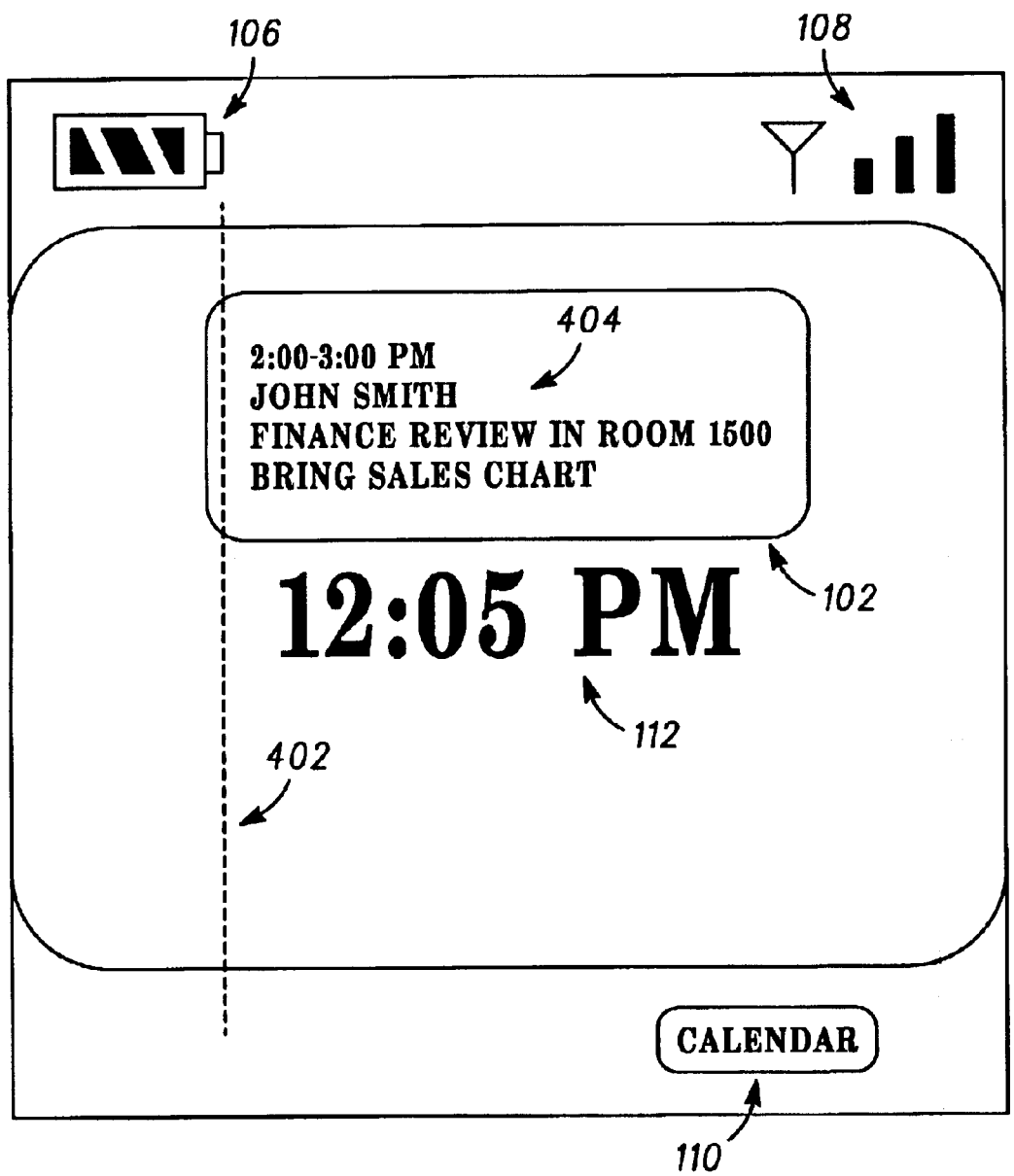
FIG. 4 is an exemplary screen saver display of the second aspect of the present invention.

Referring to FIG. 4, there is provided a second aspect of the present invention. Compare to the screen saver display 100, the screen saver display 400 additionally includes a tripwire 402, which is an imaginary trigger line not visible on the display and which triggers a change in the message bubble 102 as the message bubble moves towards the tripwire and reaches it. The message bubble 102 in FIG. 4 is shown to have just reached the tripwire, and the previous message 104 in the message bubble has been replaced with a new message 304. The new message is associated with the same calendar entry 202 as the previous message, but provides more information from the calendar entry. To draw attention of the user, the message bubble may include a visual attribute such as, but not limited to, changing color, expanding the bubble, and flashing the message.

Figure 5:
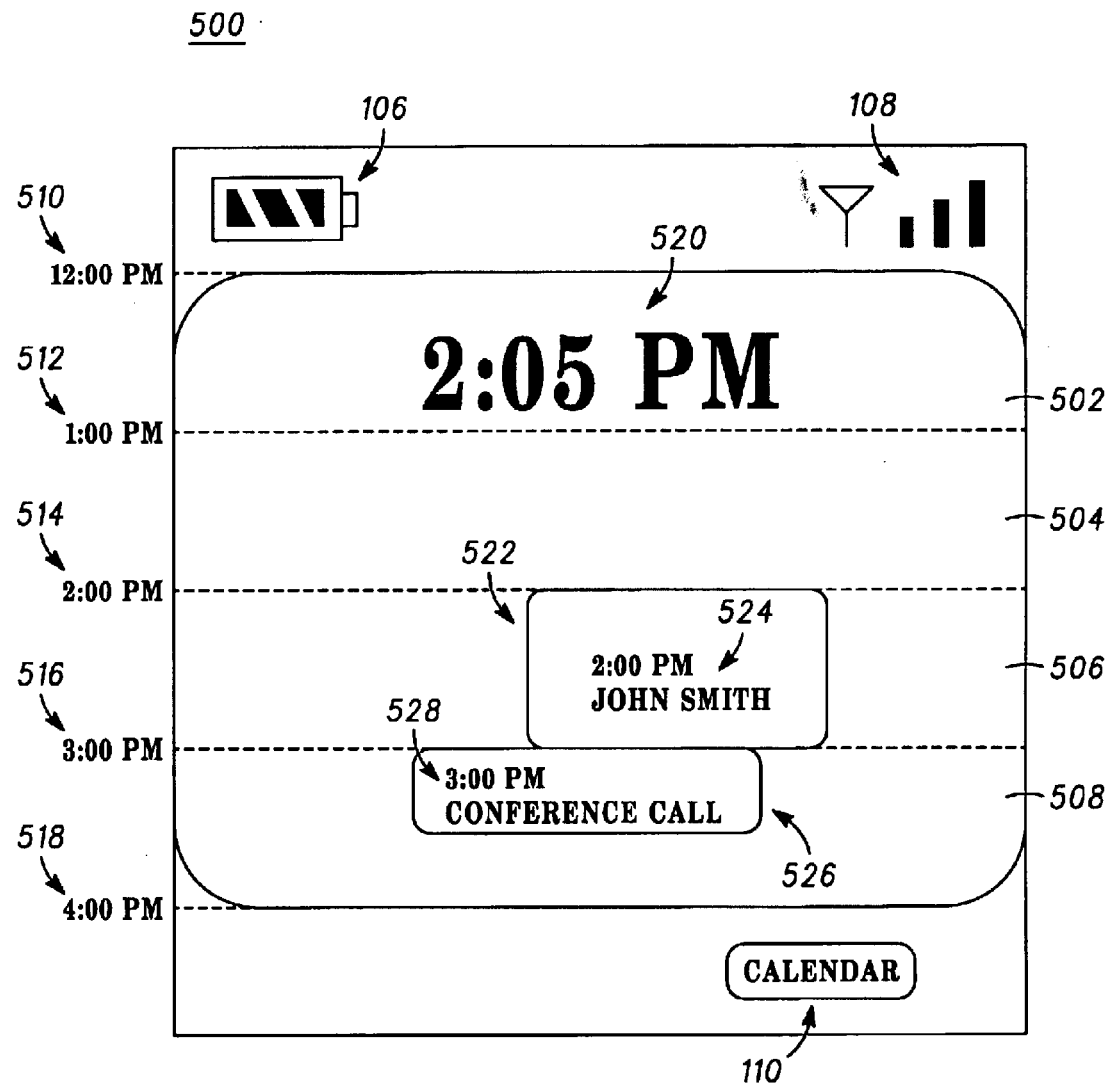
FIG. 5 is an exemplary screen saver display of the third aspect of the present invention.

Referring to FIG. 5, there is provided a third aspect of the present invention. The screen saver display 500 is partitioned horizontally into multiple bands (four shown, 502, 504, 506, and 508 with each band bound by time labels 510, 512, 514, 516, and 518) with each band representing a predetermined time period. The band separations shown with dotted lines may not be visible on the display. In this example, the display is partitioned into four bands, each band representing one hour from 12:00 PM to 4:00 PM, and the hour of the current time 520 located at the center of the display. The current time may be displayed at the center, or another location on the display to avoid obstructing the message bubble. A first message bubble 522 containing a first message 524 is displayed in the band 504 corresponding to the scheduled time of the calendar entry 202. Referring back to FIG. 2, the first message 524 is associated with the message source 200, and is derived from the entry 202 in the message source. A second message bubble 526 containing a second message 528 is displayed in the band 508 corresponding to its scheduled time of the entry 204. In this example, the size of each message bubble is made to represent the length of the scheduled event. The displayed message may be expanded to provide more information regarding the associated scheduled event by setting a predetermined time prior to the scheduled time or by providing a tripwire as described in the previous examples. Past message may be removed from the screen saver display after a predetermined time past the scheduled time. The screen saver display may be partitioned vertically instead of horizontally, and the number of bands and the time span covered by the bands may be varied according to the user's preference. To avoid obscuring messages, multiple messages in the same time slot may be displayed by one message bubble following another message bubble or one message partially overlapping another message.

Figure 6:
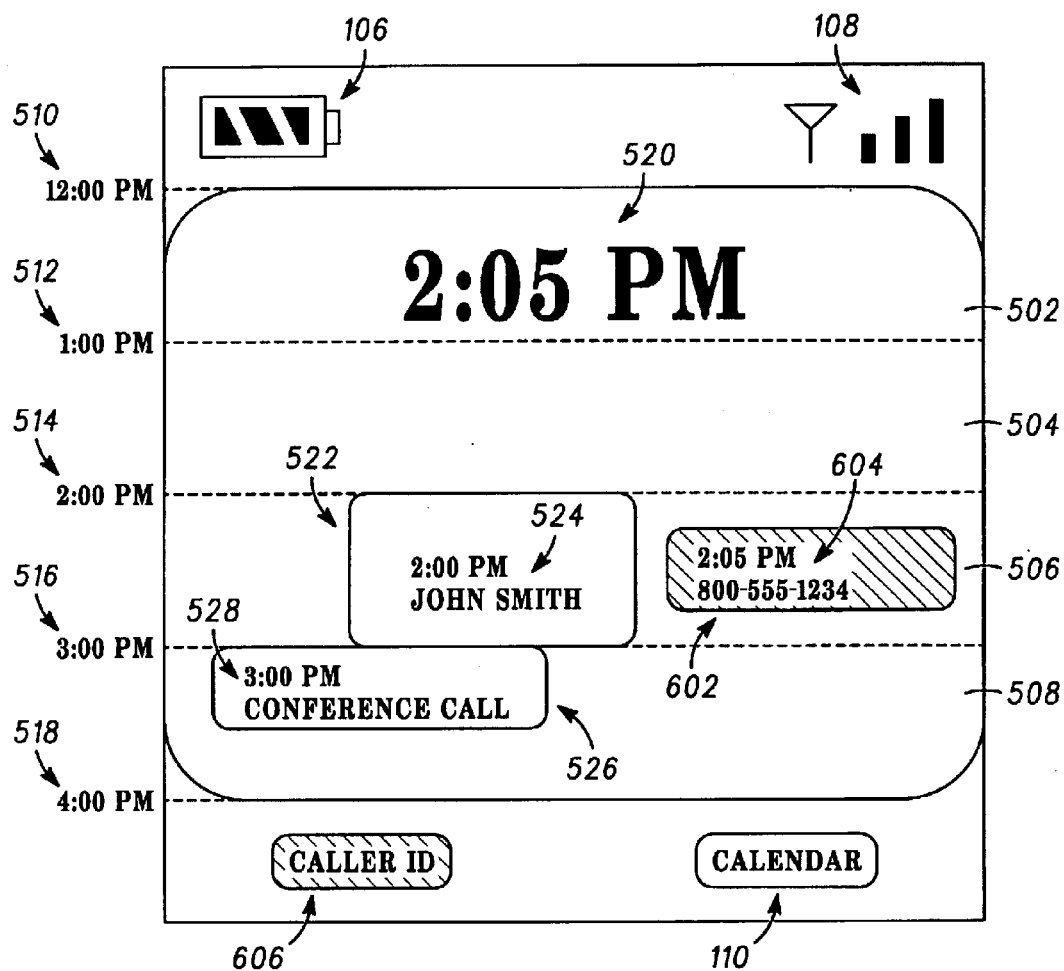
FIG. 6 is an exemplary screen saver display having two different types of messages.
Figure 7:
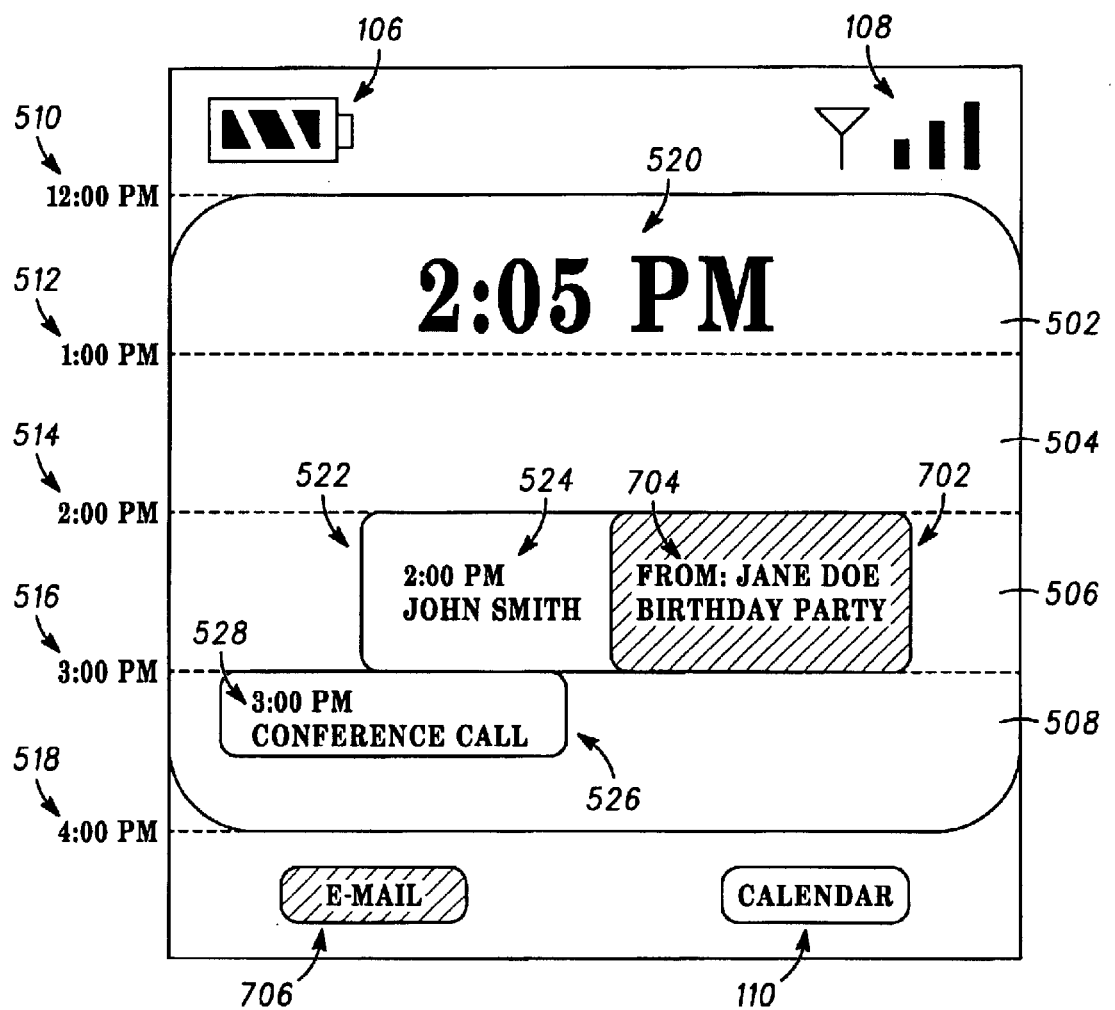
FIG. 7 is another exemplary screen saver display having two different types of messages.

For a different message source, such as, but not limited to Caller ID, e-mail, and SMS, a new message may be displayed immediately upon reception. To avoid obstructing the message that is already displayed ("previous message"), the new message may be displayed following or offsetting from the previous message. The new message may also have a different visual attribute to distinguish its message source from the message source of the previous message. In FIG. 6, an example of a caller ID message is illustrated in addition to the calendar messages of FIG. 5. A third message bubble 602, containing a caller ID message 604 having the time and the number of the call, is displayed following the calendar message bubble 522. The associated message source 606 for the third message bubble is also displayed, which has the same visual attribute as the third message bubble of a black background with white letters for easier visual association. In FIG. 7, an example of an e-mail message is illustrated in addition to the calendar messages of FIG. 5. A fourth message bubble 702, containing an e-mail message 704 having the sender and the subject of the e-mail, is displayed overlapping but offset from the calendar message bubble 522. The associated message source 706 for the fourth message bubble is also displayed, which has the same visual attribute as the fourth message bubble for easier visual association.

Figure 8:
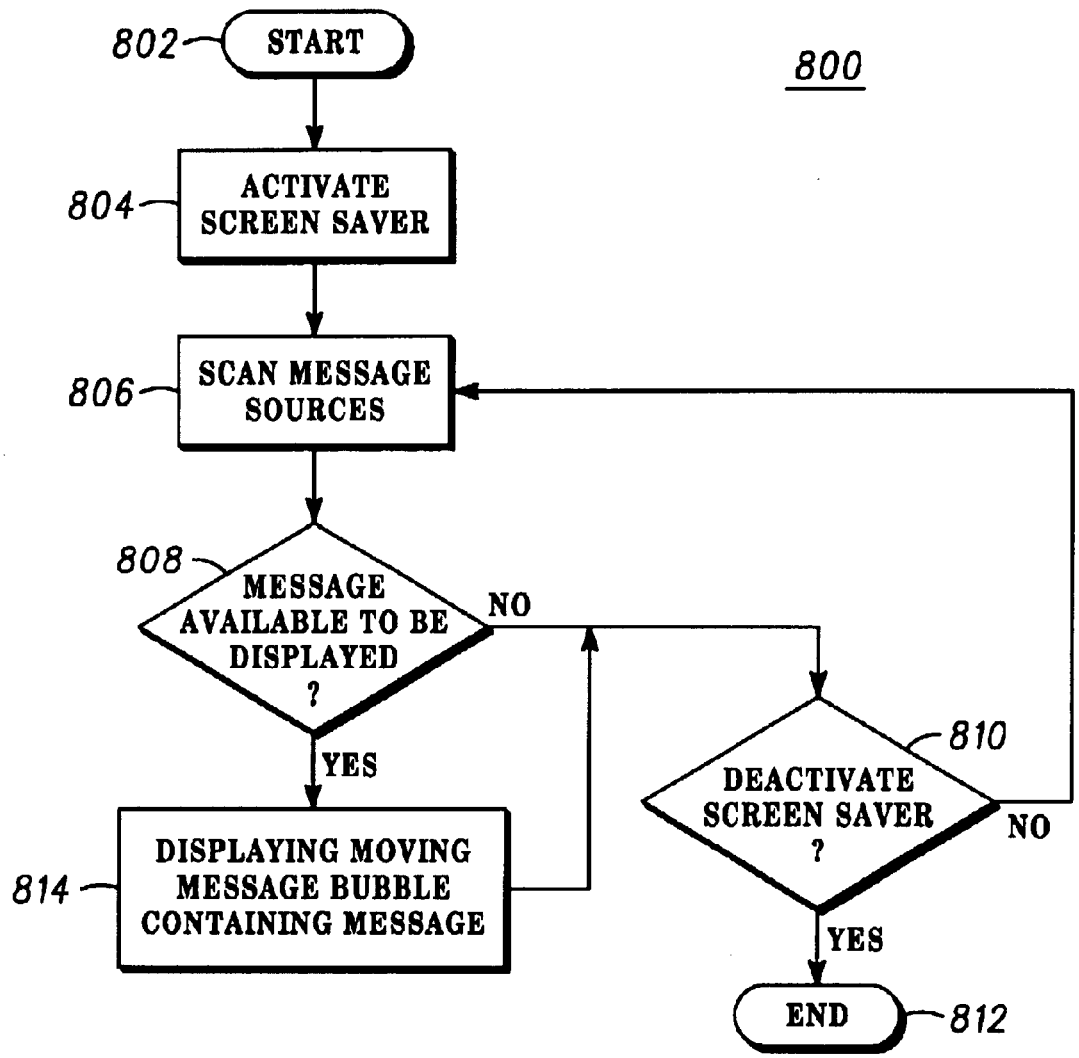
FIG. 8 is an exemplary flow diagram representing a preferred operation of the preferred embodiment of the present invention.

Referring to FIG. 8, there is provided an exemplary flow diagram 800 representing a preferred operation of the preferred embodiment of the present invention. As the screen saver program of the electronic is activated in block 804, the program scans all available message sources such as, but not limited to, calendar, e-mail, caller ID, and SMS, in block 806 and determines if there are any messages to be displayed in block 808. If there are no messages to be displayed at this time, then the program determines whether to terminate the screen saver program in block 810. If the screen saver program is terminated, then the electronic device resumes its normal operation in block 812. Otherwise, the program repeats from block 806 and scans all available message sources. If there is a message to be displayed found in block 808, a moving message bubble is displayed containing the message, or a first message derived from the message, in block 814. Then the program determines whether to terminate the screen saver program in block 810. If the screen saver program is terminated, then the electronic device resumes its normal operation in block 812. Otherwise, the program repeats from block 806 and scans all available message sources.

Figure 9:
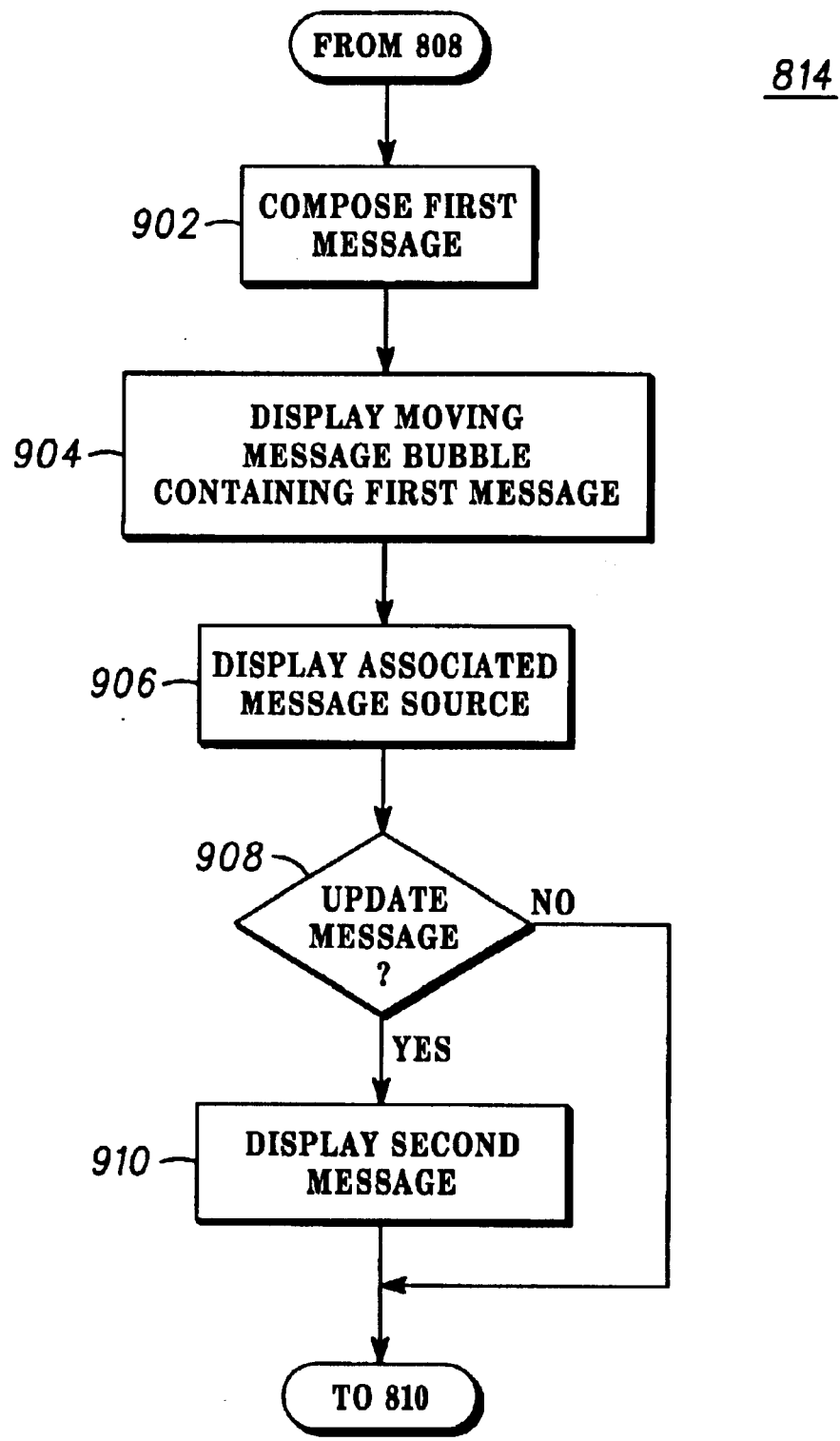
FIG. 9 is an exemplary flow diagram further describing block 814 of FIG. 8.

Referring to FIG. 9, there is provided an exemplary flow diagram describing detailed blocks of block 814 of FIG. 8. After finding an message to be displayed in block 808, a first message associated with and derived from the message may be composed in block 902. However, the first message may also be the same as the message. For example, if the message is a calendar entry, then the first message may only contain the time and the subject matter of the calendar entry without any additional information that is contained in the original calendar entry. If the message is an e-mail, then the first message may only contain the sender and the subject of the e-mail without displaying the actual content of the e-mail. If the message is a caller ID containing only the time of the call and the phone number, the first message may be the same as the message. In block 904, a moving message bubble is displayed containing the first message, and the message source of the first message being displayed is also displayed in block 906. The screen saver display may be partitioned into multiple horizontal or vertical bands with each band representing a predetermined time period such that the moving message bubble is displayed along the band corresponding to the relevant time of the message. In block 908, the screen saver program determines whether to update the first message being displayed based upon a predetermined condition. If the predetermined condition is met, then the second message is displayed replacing the first message in block 910, and the program advances to the next block 810. The second message may also be derived from the same message as the first message but may provide more information or detail than the first message. If there is no need to update the first message, then the program advances to the next block 810. The predetermined condition may be a tripwire setup on the screen of the electronic device such that as the moving message bubble reaches the tripwire, the first message is replaced with the second message. The predetermined condition may also be related to the time of the message. For example, for a calendar entry such as an appointment at 2:00 PM, the user may set the program such that 15 minutes before the appointment time of 2:00 PM, the first message is replaced with the message providing more information regarding the 2:00 PM appointment. In block 910 of displaying the second message, the second message may also display a visual attribute such as, but not limited to, changing color, expanding the bubble, and flashing the message, that is likely to draw attention of the user.

The screen saver display may be partitioned into multiple horizontal or vertical bands with each band representing a predetermined time period. A moving message bubble may be displayed along a band that corresponds to the relevant time of the message associated with the bubble.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A screen saver display for an electronic device having a device display for graphically providing information to a user, the screen saver display comprising:
   a moving message bubble;
   a message displayed within the moving message bubble, the message derived from a message source; and
   a tripwire across the screen saver display,
   wherein the message is replaced by a subsequent message derived from the message source upon the moving message bubble reaching the tripwire.

2. The screen saver display of claim 1, wherein the message is replaced by the subsequent message derived from the message source upon reaching a predetermined time period prior to a time period associated with the first message.

3. The screen saver display of claim 1, wherein the message source is at least one of:
   an entry of a calendar program running in the electronic device,
   an electronic mail message received by the electronic device,
   a Short Message Service message received by the electronic device, and
   a caller ID program running in the electronic device.

4. The screen saver display of claim 1, wherein the moving message bubble further comprises a visual attribute associated with the message source, the visual attribute dynamically variable based upon a predetermined condition.

5. The screen saver display of claim 1, further comprising:
   a status indicator indicative of an internal operating system status of the electronic device.

6. The screen saver display of claim 5, wherein the status indicator is dynamically varied based upon the internal operating system status of the electronic device.

7. A screen saver display for an electronic device having a device display for graphically providing information to a user, the screen saver display comprising:
   a moving message bubble;
   a message associated with a message source, the message displayed within the moving message bubble; and
   a plurality of bands partitioning the screen saver display, each of the plurality of bands representing a predetermined time period,
   wherein the message is dynamically varied.

8. The screen saver display of claim 7, wherein the moving message bubble is displayed centered about and is allowed to move along one of the plurality of bands representing a time period associated with the message.

9. The screen saver display of claim 7, wherein the message source is at least one of:
   an entry of a calendar program running in the electronic device,
   an electronic mail message received by the electronic device,
   a Short Message Service message received by the electronic device, and
   a caller ID program running in the electronic device.

10. A method for graphically providing information in a screen saver application to a user of an electronic device having a device display, the method comprising:
    displaying a screen saver display;
    displaying a moving message bubble within the screen saver display;
    displaying a message derived from a message source with the moving message bubble;
    providing a tripwire across the screen saver display; and
    replacing the message with a subsequent message derived from the message source upon the moving message bubble reaching the tripwire.

11. The method of claim 10 further comprising:
    replacing the message with the subsequent message derived from the message source upon reaching a predetermined time period prior to a time period associated with the message.

12. The method of claim 10, wherein the message source is at least one of:
    an entry of a calendar program running in the electronic device,
    an electronic mail message received by the electronic device,
    a Short Message Service message received by the electronic device, and
    a caller ID program running in the electronic device.

13. The method of claim 10 further comprising:
    displaying with the moving message bubble a visual attribute associated with the message source; and
    dynamically varying the attribute based upon a predetermined condition.

14. The method of claim 10 further comprising:
    displaying a status indicator indicative of an internal operating system status of the electronic device.

15. The method of claim 14 further comprising:
    dynamically varying the status indicator based upon the internal operating system status of the electronic device.

16. A method for graphically providing information in a screen saver application to a user of an electronic device having a device display, the method comprising:
    displaying a screen saver display;
    partitioning the screen saver display into a plurality of bands;
    assigning each of the plurality of bands to a predetermined time period;
    displaying a moving message bubble within the screen saver display;
    displaying a message derived from a message source within the moving message bubble; and
    dynamically varying the message displayed within the moving message bubble.

17. The method of claim 16 further comprising:
    displaying the moving message bubble centered about one of the plurality of bands representing a time period associated with the message.

18. The method of claim 16, wherein the message source is at least one of:
    an entry of a calendar program running in the electronic device,
    an electronic mail message received by the electronic devices,
    a Short Message Service message received by the electronic device, and
    a caller ID program running in the electronic device.

* * * * *

UNITED STATES PATENT AND TRADEMARK OFFICE
CERTIFICATE OF CORRECTION

PATENT NO. : 6,903,743 B2
DATED : June 7, 2005
INVENTOR(S) : Ng, Scott

It is certified that error appears in the above-identified patent and that said Letters Patent is hereby corrected as shown below:

<u>Column 6,</u>
Line 28, insert -- visual -- before "attribute".
Line 62, delete "devices" and replace with -- device --.

Signed and Sealed this

Thirtieth Day of August, 2005

JON W. DUDAS
*Director of the United States Patent and Trademark Office*